United States Patent
Watanabe et al.

(10) Patent No.: US 6,790,300 B2
(45) Date of Patent: Sep. 14, 2004

(54) METHOD AND APPARATUS FOR BONDING SUBSTRATE PLATES TOGETHER THROUGH GAP-FORMING SEALER MATERIAL

(75) Inventors: Hiroyuki Watanabe, Odawara (JP); Yuji Otsubo, Isehara (JP); Shinji Sugizaki, Odawara (JP); Hisayoshi Ichikawa, Ashigara (JP); Hiroaki Kiyomiya, Yokohama (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/951,512

(22) Filed: Sep. 14, 2001

(65) Prior Publication Data

US 2002/0043344 A1 Apr. 18, 2002

(30) Foreign Application Priority Data

Sep. 14, 2000 (JP) .................................. 2000-280511
Nov. 28, 2000 (JP) .................................. 2000-361184

(51) Int. Cl.$^7$ .............................................. B32B 31/20
(52) U.S. Cl. ................. 156/64; 156/103; 156/291; 156/299; 100/46; 100/206; 100/207
(58) Field of Search ................... 156/64, 103, 312, 156/311, 299, 290, 291; 100/46, 206, 207

(56) References Cited

U.S. PATENT DOCUMENTS 4,543,147 A  * 9/1985  Noto et al. ............... 156/288
6,129,804 A  * 10/2000 Gaynes et al. ........... 156/297

* cited by examiner

Primary Examiner—Richard Crispino
Assistant Examiner—George R. Koch, III
(74) Attorney, Agent, or Firm—Keady, Olds & Maier PLLC (57) ABSTRACT

Method and apparatus for registering and bonding upper and lower substrate plates together through a sealer material and in such a way as to form a gap of a predetermined width between the two substrate plates. Registered substrate plates are provisionally pressed to form a joined substrate assembly, which is then pressed under heated conditions at a hot press station, thereby compressing the sealer material into a flattened form and at the same time thermally hardening the sealer material to form a predetermined gap space between the two substrate plates. In order to correct positional deviations which occur to the upper and lower substrate plates in the course of the hot pressing, on the basis detected positional deviations of upper and lower substrate plates of a hot-pressed substrate assembly, upper and lower substrates are set in offset positions instead of aligned positions when registering them at the provisional press station to cancel predicted positional deviations at the hot press station.

11 Claims, 7 Drawing Sheets

METHOD AND APPARATUS FOR BONDING SUBSTRATE PLATES TOGETHER THROUGH GAP-FORMING SEALER MATERIAL

BACKGROUND OF THE INVENTION

1. Field of the Art

This invention relates to a method and an apparatus, for bonding substrate plates face to face in a predetermined gap relation through an interposed spacer material, and more particularly to a method and apparatus for bonding, for example, upper and lower substrate plates which form a liquid crystal cell of an LCD panel, strictly registering relative positions of the two substrate plates with each other and then pressing the substrate plates toward each other to compress and flatten the interposed sealer material to such a degree as to form a gap of a predetermined width between the upper and lower substrate plates.

2. Prior Art

A liquid crystal cell of an LCD panel is formed by bonding together a couple of substrate plates of transparent synthetic resin material through a sea sealer material which is interposed between and along outer marginal edges of the substrate plates, and filling liquid crystal in a sealed gap space which is formed between the two substrate plates by the sealer material. For instance, in the case of a color TFT type LCD panel, a lower substrate plate constitutes a TFT substrate which has circuit patterns including TFT elements formed thereon in the fashion of a matrix, while an upper substrate constitutes as a filter substrate which has color filters formed thereon A driver IC and a printed circuit board are connected to the TFT substrate of the LCD panel. More particularly, the LCD panel is fabricated in the manner as described below.

Firstly, a sealer material is applied along outer marginal edges of either the TFT substrate or the filter substrate. Then, the two substrate plates are overlapped one on the other, namely, in such a way that the filter substrate comes on top of the TFT substrate. Normally, a sealer material is applied on the side of the lower TFT substrate and in the shape of a rectangular frame which is partly opened by a void portion. The initial thickness of the applied sealer material is larger than the width of a gap space to be ultimately formed between the two substrate plates in a subsequent hot-pressing stage.

In the next place, the two substrate plates are adjusted to a registered position relative to each other and the overlapped substrate plates are pressed and temporarily fixed to each other. At this time, it has been the general practice to apply, for example, an ultraviolet hardening synthetic resin spot-wise and to irradiate ultraviolet ray for temporarily fixing them. Thereafter, the substrate plates are pressed toward each other under heated conditions in such a way as to press and flatten the interposed sealer material for adjusting a gap width between the two substrate plates. In this hot-pressing stage, heat is applied to harden the sealer material. However, the sealer material is hardened only to such a degree as to maintain a certain gap width between the two substrate plates in a stable state. Finally, the temporarily bonded substrate plates are sent to a hot-hardening stage to thermally harden the sealer material completely.

In the above-mentioned hot-pressing stage, a couple of substrate plates are pressed under heated conditions by the use of a press means, which is provided with heated upper and lower press members. However, since the substrate plates of an LCD panel are formed of a relatively fragile material like glass and synthetic resin, they can be easily damaged if hot press members are abutted directly against the respective substrate plates. Therefore, in most cases the abutting faces of the upper and lower pressing members are covered with a cushioning material like a rubber sheet of a predetermined thickness, so that the pressing members are abutted against the substrate plates through a cushioning material.

In this connection, recently there is a strong trend toward high-resolution fine-pitch LCD panels, which require to register and bond substrate plates to each other in an extremely strict and precise manner because a very slight positional deviation of several micrometers or less is impermissible in the case of fine-pitch LCD panels. Therefore, in a substrate bonding stage, positions of substrate plates are adjusted relative to each other very strictly. However, no matter how strictly substrate plates are one on the other before pressing, it cannot guarantee that the bonded substrate plates stay in the registered position without deviations therefrom. The reason for this is that, as the substrate plates are pressed in the hot-pressing stage, a pressing force is applied thereto through a cushioning material which is compressed and flexed under the pressing force. As a cushioning material is compressed and caused to flex, it is difficult to control the direction of flexure, which more or less differ from one cushioning member to another. Namely, in some cases the pressing members fail to press substrate plates in a normal straightforward direction, and, since the interposed sealer material is not yet hardened in the hot-pressing stage, may give rise to a detrimental positional deviation between upper and lower substrates. Although the overlapped two substrate plates are temporarily bonded by an ultraviolet hardening synthetic resin, the bondage by the synthetic resin is strong enough only for preventing deviations of the substrate plates in handling or in the course of transfer. If the overlapped substrate plates are strongly bonded by an ultraviolet hardening synthetic resin, it will become difficult to determine the gap width precisely later in the hot-pressing stage.

No positional deviations occur to the overlapped substrate plate as long as the cushioning members on the upper and lower pressing members of the press means of the same compressive characteristics, namely, as long as the cushioning members on upper and lower pressing members are flexed in the same direction and to the same degree and distorted in the same manner when compressed. On the other hand, for example, in case upper and lower cushioning members are flexed in the opposite directions upon compression in the hot-pressing stage, this difference in compressive characteristics results in amplification of relative movements of upper and lower substrate plates and thus in augmentation of positional deviations of the upper and lower substrate plates.

Accordingly, it is important to carefully select suitable cushioning material to be adhered on the pressing members of the press means to make sure that the cushioning pad members on the upper and lower pressing members have the same compressive characteristics. For this reason, the selection of cushioning material is met by various limitations. In this regard, it is possible to produce a large number of cushioning pad members and select therefrom pairs of matching compressive characteristics for the upper and lower pressing members. However, the pad selection of this sort is very troublesome, in addition to a detrimental drawback that a large amount of material has to be wasted. Besides, there is little possibility of finding a pair of cushioning pads which perfectly match in compressive characteristics. Therefore, it is difficult to cope with the demands for fine-pitch LCD panels of higher grades, simply through selection of cushioning pads. Further, since a pressure is applied on substrate plates under heating conditions, cushioning pads undergo accelerated deteriorations under the influence of heat and need to be replaced after use over a certain period of time. The replacements of cushioning pads involve the same problem as explained above.

Thus, there are great limits to preventing positional deviations of substrate plates in a hot-pressing stage by matching compressive characteristics of cushioning pads to be adhered on upper and lower press members. Regarding methods without using cushioning pads, there have thus far been proposed various methods, for example, a method of pressing substrate plates by the use of a fluid pressure. However, since a pressing method of this sort invariably requires complicate equipments for the supply of a fluid and for the control of fluid pressure, it is still the general practice to resort to a pressing method using cushioning pads.

SUMMARY OF THE INVENTION

In view of the foregoing situations, it is an object of the present invention to provide a method and an apparatus for hot-pressing substrate plates precisely in an aligned state despite the use of press members with cushioning material.

It is another object of the present invention to a method and an apparatus which can effectively correct positional deviations which normally inevitably occur to upper and lower substrate plate in the course of hot pressing.

It is still another object of the present invention to provide a method and an apparatus which can obviate the necessity for adjusting compressive properties of cushioning material to be bonded on abutting surfaces of upper and lower pressing members, while guaranteeing to hot-press substrate plates accurately.

In accordance with the present invention, for achieving the above-stated objective, there is provided a method for bonding two substrate plates together through a sealer material and in a precisely aligned state in a stage of hot-pressing the two substrate plate to form a gap space of a predetermined width therebetween, the method comprising the steps of: registering two substrate plates one on the other in a registering stage in reference to alignment marks provided on the respective substrate plates and in such offset positions as to cancel positional deviations which predictably occur to the substrate plates during a subsequent hot-pressing operation; provisionally pressing the registered substrate plates through a sealer material in a provisional press stage to form a joined substrate assembly; hot-pressing the joined substrate assembly on a press means and under heated conditions in a hot pressing stage thereby compressing and flattening the sealer material to form a gap space of a predetermined width between the substrate plates and at the same time thermally hardening the sealer material; and inspecting the hot-pressed substrate assembly in an inspecting stage to check for positional deviations between the upper and lower substrate plates.

In short, in order to correct positional deviations which occur to the upper and lower substrate plates of a joined substrate assembly in the course of a hot-pressing operation, the two substrate plates are set in such offset position in a preceding registering stage as to cancel the predicted relative positional deviations at a hot press station. In this instance, in the registering stage, relative positions of the two substrate plates are either shifted horizontally in two directions along two perpendicularly intersecting axes or shifted in a rotational or angular direction in addition to shifts along two perpendicularly intersecting axes.

According to the present invention, there is also provided an apparatus for bonding two substrate plates together through a sealer material and in a precisely aligned state in the course of hot-pressing the two substrate plate to form a gap space of a predetermined width therebetween, the apparatus comprising: a provisional press mechanism for provisionally registering and bonding the substrate plates into the form of a joined substrate assembly, the provisional press mechanism including upper and lower substrate holder means adapted to hold upper and lower substrate plates in face to face relation, an alignment mark detection means adapted to detect relative positions of the substrate plates from picture images of alignment marks provided on each one of the substrate plates, and a substrate position adjusting means provided in association with one of the substrate holder means for adjusting position of one substrate plate relative to the other substrate plate in reference to the alignment marks; a hot press mechanism located at a hot press station and having upper and lower press members with heating means, the upper and lower press members being movable toward and away from each other for hot-pressing the joined substrate assembly through cushioning material; a positional deviation detecting mechanism adapted to detect relative positional deviations between the two substrate plates of the hot-pressed substrate assembly in reference to the alignment marks; and a control means adapted to record offset data for correction of positional deviations of the substrate plates of the joined substrate assembly occurring in the course of hot pressing, and to control the substrate position adjusting mechanism of the provisional press to set the substrate plates in such offset positions as to cancel predicted positional deviations at the hot press station.

The above and other objects, features and effects of the present invention will become apparent from the following particular description of the invention, taken in conjunction with the accompanying drawings which show by way of example a preferred embodiment of the invention. Needless to say, the present invention should not be construed as being limited to particular forms shown in the drawings.

DESCRIPTION OF PREFERRED EMBODIMENTS

Figure 1:
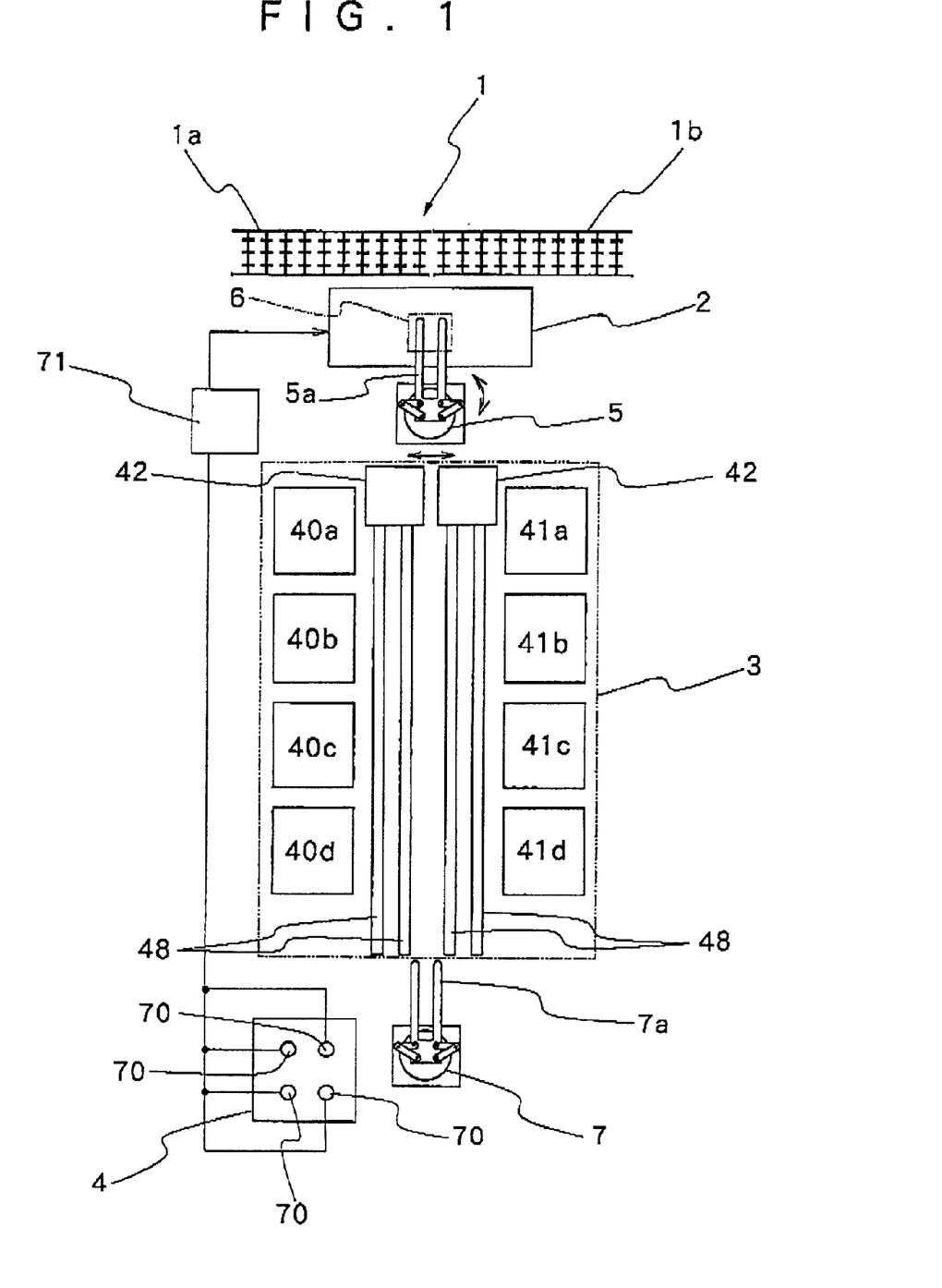
FIG. 1 is a schematic view of an apparatus for bonding substrate plates according to one preferred embodiment of the invention, showing the general layout of the bonding apparatus.

Hereafter, the present invention is described more particularly by way of its preferred embodiment with reference to the accompanying drawings. Reference is firstly had to FIG. 1 which shows general layout of a substrate bonding press according to the present invention. In this figure, indicated at 1 is a substrate conveyer, at 2 a provisional press station, at 3 a hot press station and at 4 an inspection station.

Figure 2:
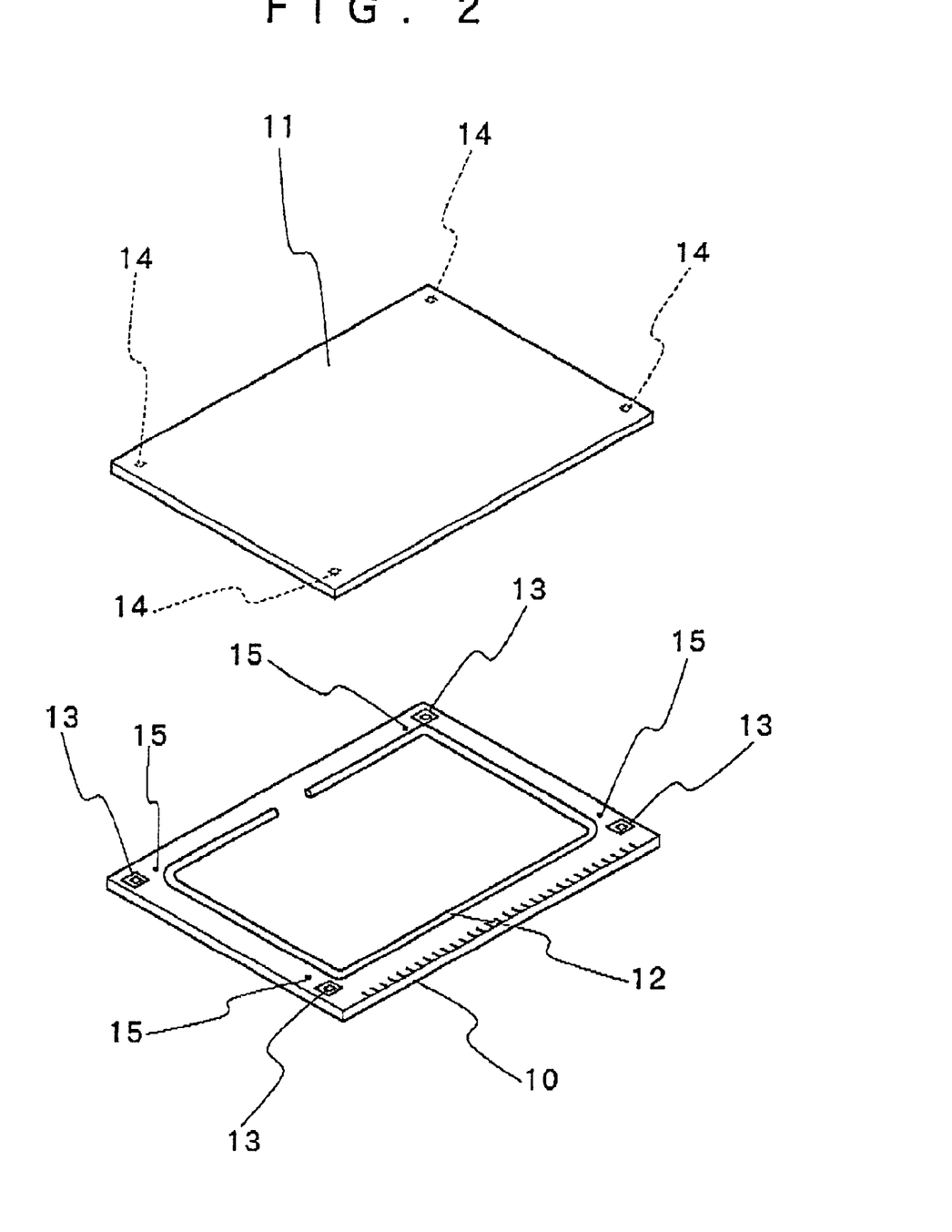
FIG. 2 is a schematic perspective view of upper and lower substrate plates.

In FIG. 2, denoted at 10 and 11 are lower and upper substrates, for example, a TFT substrate and a filter substrate of an LCD panel, respectively. A sealer material 12 is applied on the lower substrate 10 before pressing. For example, the sealer material 12 is applied along marginal edges of the lower substrate plate 10 in a rectangular frame-like pattern with an open void portion at a predetermined position. After pressing and the two substrate plates 10 and 11 to adjust a gap space to a predetermined width, liquid crystal is sealed in the gap space through the open void portion. The void portion in the sealer material is ultimately closed with a similar sealer material. A large number of electrodes are formed at least at one side edge of the lower substrate plate 10 for connecting thereto IC drivers which are not shown in the drawings. Connected to the IC drivers is a printed circuit board which is also not shown in the drawings.

The lower substrate plate 10 is provided with four alignment marks 13 in its four corner portions, while the upper substrate 11 is similarly provided with four alignment marks 14 in exactly corresponding positions. Further, droplets of ultraviolet hardening resin are spotted on the lower substrate plate 10, each in the vicinity of each alignment mark 13.

As seen in FIG. 1, the substrate conveyer 1 is constituted by roller conveyers 1a and 1b which are arranged to transfer lower and upper substrate plates 10 and 11 toward a predetermined delivery position in front of a temporary or provisional press station 2, respectively. Then, by operation of a substrate transfer mechanism, for example, by a substrate transfer robot, upper and lower substrate plates 10 and 11 are transferred to the provisional bonding station 2. At this provisional bonding station 2, the upper substrate plate 11 is reversed and superposed on the lower substrate plate 10 after registering the two substrate plates in reference to the alignment marks. Then, the two substrate plates 10 and 11 are provisionally bonded to each other by hardening the ultraviolet hardening resin 15. The provisionally bonded substrate plates 10 and 11 are herein called "a joined substrate assembly." The ultraviolet hardening resin 15 may be applied prior to delivery to the provisional bonding station 2. However, it is preferred to supply the ultraviolet hardening resin 16 to a lower substrate 10 immediately before superposing an upper substrate 11 at the provisional bonding station 2. Therefore, the provisional press station 2 is preferred to include means for supplying an ultraviolet hardening resin.

Figure 3:
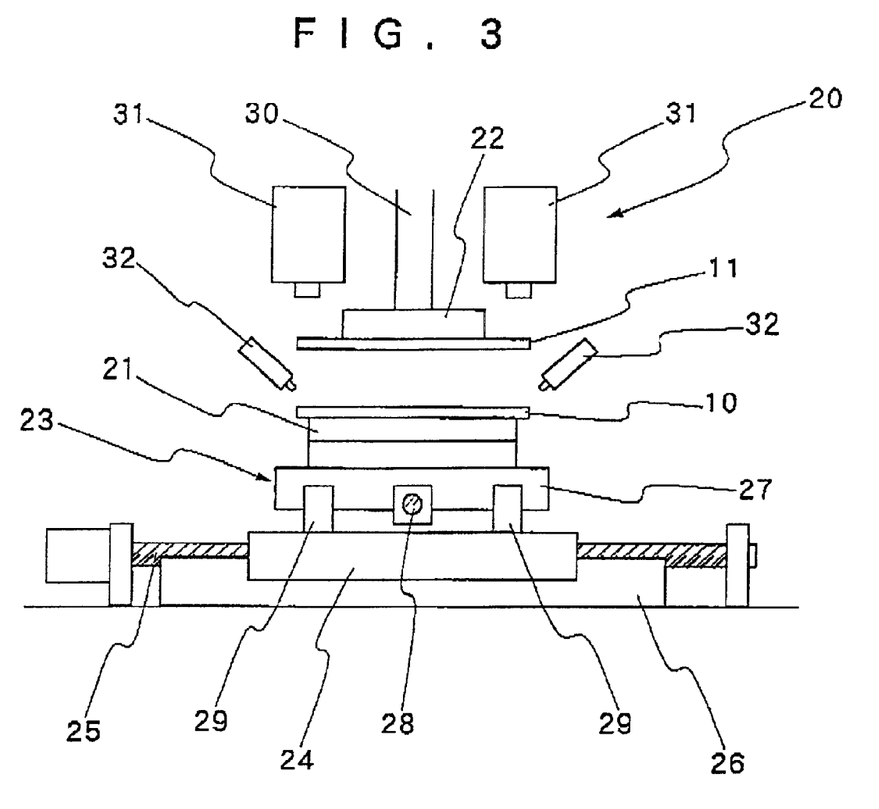
FIG. 3 is a schematic illustration of a provisional press mechanism.

Shown schematically in FIG. 3 is a provisional press station 2, which is primarily constituted by a provisional press 20 including a registration mechanism and a provisional press mechanism. The provisional press mechanism 20 is provided with a substrate plate holder means, including a substrate holder table 21 and a suction pad 22 for holding lower and upper substrate plates 10 and 11, respectively. The substrate holder table 21 and the suction pad 22 are arranged to grip lower and upper substrate plates 10 and 11 in position by suction force. For registration of alignment marks, the lower and upper substrate plates 10 and 11 on the substrate holder table 21 and the suction pad 22 are held in a vertically overlapped state while their relative positions are adjusted.

For this purpose, the lower substrate holder table 21 is constituted by a turn table for adjusting the position of a lower substrate plate in the direction of angle θ, namely, in rotational direction. Further, the lower substrate holder table 21 is connected to an X-Y position adjusting mechanism 23 thereby to adjust the position of a lower substrate plate 10 in X and Y directions, that is, in the directions of X- and Y-axis. A lower table 24 of the X-Y position adjusting mechanism 23 is engaged with a feed screw 25 for movements in the direction of X-axis (in the transverse direction in the drawing) along guide rails 26, while an upper table of the X-Y position adjusting mechanism 23 is engaged with a feed screw 28 for movements in the direction of Y-axis (in a direction perpendicular to the face of the drawing) along guide rails 29. On the other hand, the suction pad 21 is connected to the lower end of a lift shaft 30 and thereby lifted up and down in the vertical direction.

Figure 4:
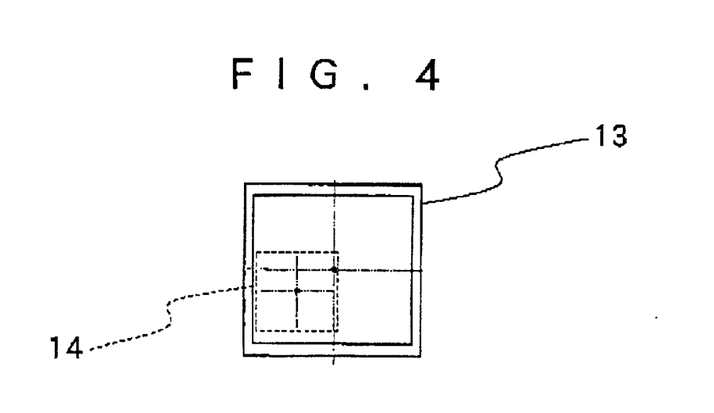
FIG. 4 is an example of the alignment mark to be provided on upper and lower substrate plates.

Located over the upper substrate plate 11 on the suction pad 22 are four TV cameras to check for relative positional deviations of the lower and upper substrate plates 10 and 11 by way of positions of the respective alignment marks 13 and 14. In this instance, for example, the alignment marks 13 and 14 may be arranged in the shapes as shown in FIG. 4. More specifically, the alignment marks on one substrate plate, for example, the alignment marks 13 on the lower substrate plate 10 may be in the shape of a square frame-like mark with a registration point at the center thereof as indicated by solid line in FIG. 4. In this case, the alignment marks 14 on the upper substrate plate 11 are in the shape of a square mark with a registration point at the center thereof as indicated by broken line in the same figure. Upon registering center points of the alignment marks 13 and 14, positions of the upper and lower substrate plates 11 and 10 are precisely aligned with each other.

The alignment marks 13 and 14 are captured in the view fields of TV cameras 31, so that the upper and lower substrate plates 11 and 10 can be brought into alignment with each other by adjusting their positional deviations on the basis of picture images which are obtained from the respective TV cameras 31. For this purpose, for example, a positional deviation in the angular direction of θ is firstly checked for, and, if there is an angular deviation between center points of the alignment marks 13 and 14 of the upper and lower substrate plates 11 and 10, the lower substrate holder table 21 is turned through a suitable angle to offset a deviation in the angle θ on the side of the lower substrate plate 10. Then, center points of the alignment marks 13 and 14 are brought into registration with each other by moving the X- and Y-axis tables 24 and 27.

After precisely aligning positions of the two substrate plates 10 and 11 in the manner as described above, the lift shaft 30 is lowered to superpose the upper substrate plate 11 on the lower substrate plate 10. At this time, the upper substrate plate 11 is pressed toward and bonded to the lower substrate plate 10 in such a way as to compress the sealer material 12. In this stage, however, the sealer material is not yet compressed to a thickness which corresponds to a width of a gap space to be formed between the upper and lower substrate plates 11 and 10. At the same time, the ultraviolet hardening resin 15 is hardened by irradiation with ultraviolet rays from ultraviolet radiators 32. As a consequence, the two substrate plates 10 and 11 are joined as a provisionally bonded substrate assembly 6 which can be handled and transferred in a stable state free of positional deviations which may otherwise occur to the respective substrate plates.

Provided between the provisional press station 2 and, a hot press station 3 is a substrate transfer means 5, having a substrate handling member 5a for picking up a joined substrate assembly from the provisional press station 2 and transferring same to the hot press station 3. As indicated by arrows in FIG. 1, the handling member 5a is capable of making turns in a horizontal plane in addition to reciprocating movements laterally in rightward and leftward directions.

Provided at the hot press station 3 are two rows of press stages, each having four press stages 40a to 40d or 41a to 41d in the particular embodiment shown. In order to supply joined substrate assemblies 6 to the respective press stages, a couple of shuttle members 42 are provided between the two rows of press stages. Each shuttle member 42 is arranged to supply joined substrate assemblies 6 to a row of press stages 40a to 40d or 41a to 41d for hot pressing the substrate assemblies 6, and, to pick up hot-pressed substrate assemblies 6 from the press stages and send them to an inspecting station 4.

Figure 5:
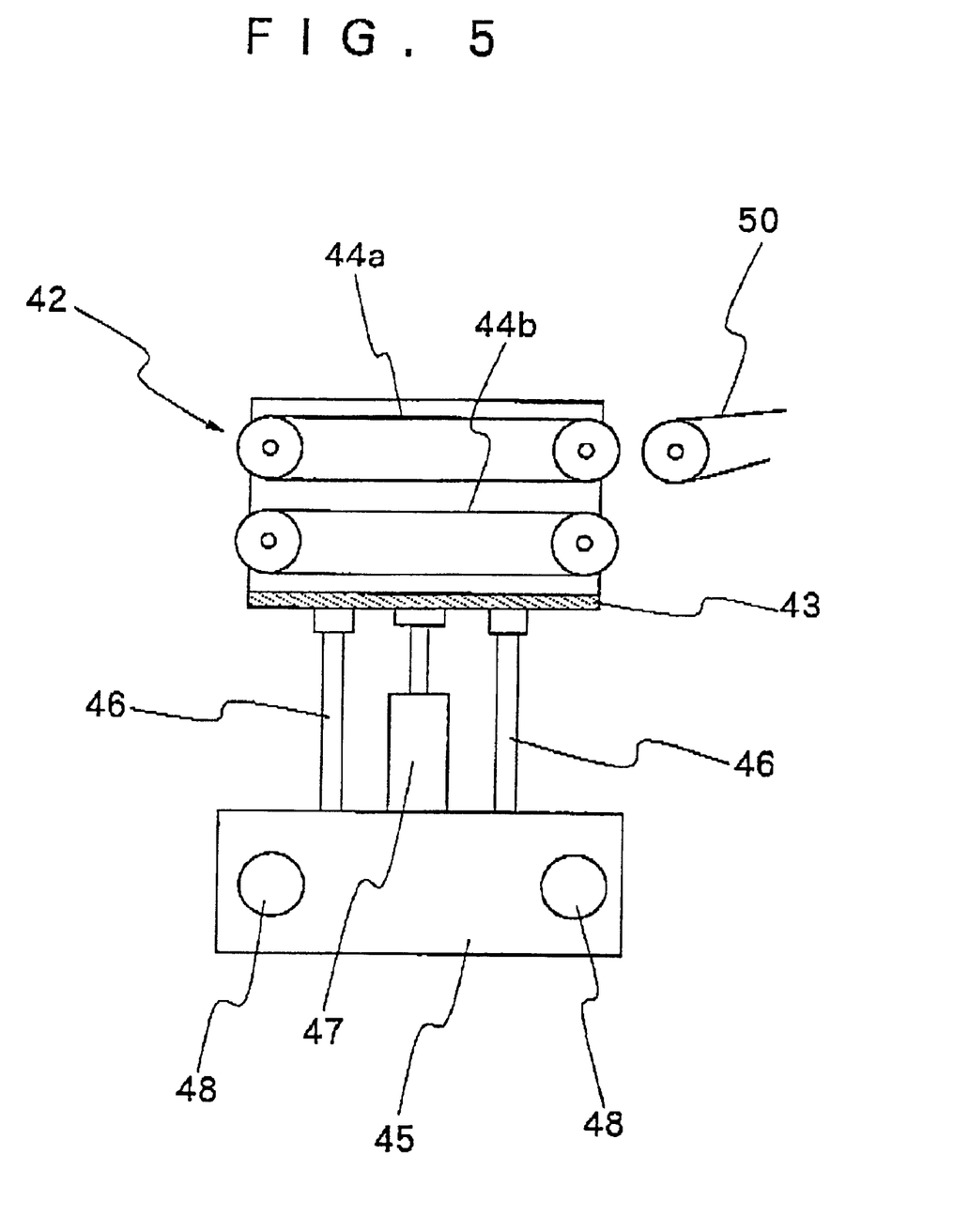
FIG. 5 is a schematic illustration of a delivery shuttle.

As shown in FIG. 5, each shuttle member 42 has conveyers 44a and 44b mounted on a support member 43, along upper and lower sides of the latter. The support member 43 is in turn supported on lift guides 46 which are erected on a carriage block 45, and moved by a cylinder 47 to and from a lowered position at which the upper conveyer 44a is located in level with a substrate transfer means 50, which is provided at each press stage as will be described hereinlater, and an upper lifted position at which the lower conveyer 44b is located in level with the just-mentioned substrate transfer means 50. The carriage block 45 is moved back and forth along a rail 48, for example, by means of a linear motor. More specifically, each shuttle member 42 is movable back and forth between a start point, which is connected to the provisional press station, and a goal point, which is connected to an inspecting station 4, through a row of press stages of the hot press station 3, and is capable of stopping at a position in front of each one of the press stages of the hot press station 3.

Figure 6:
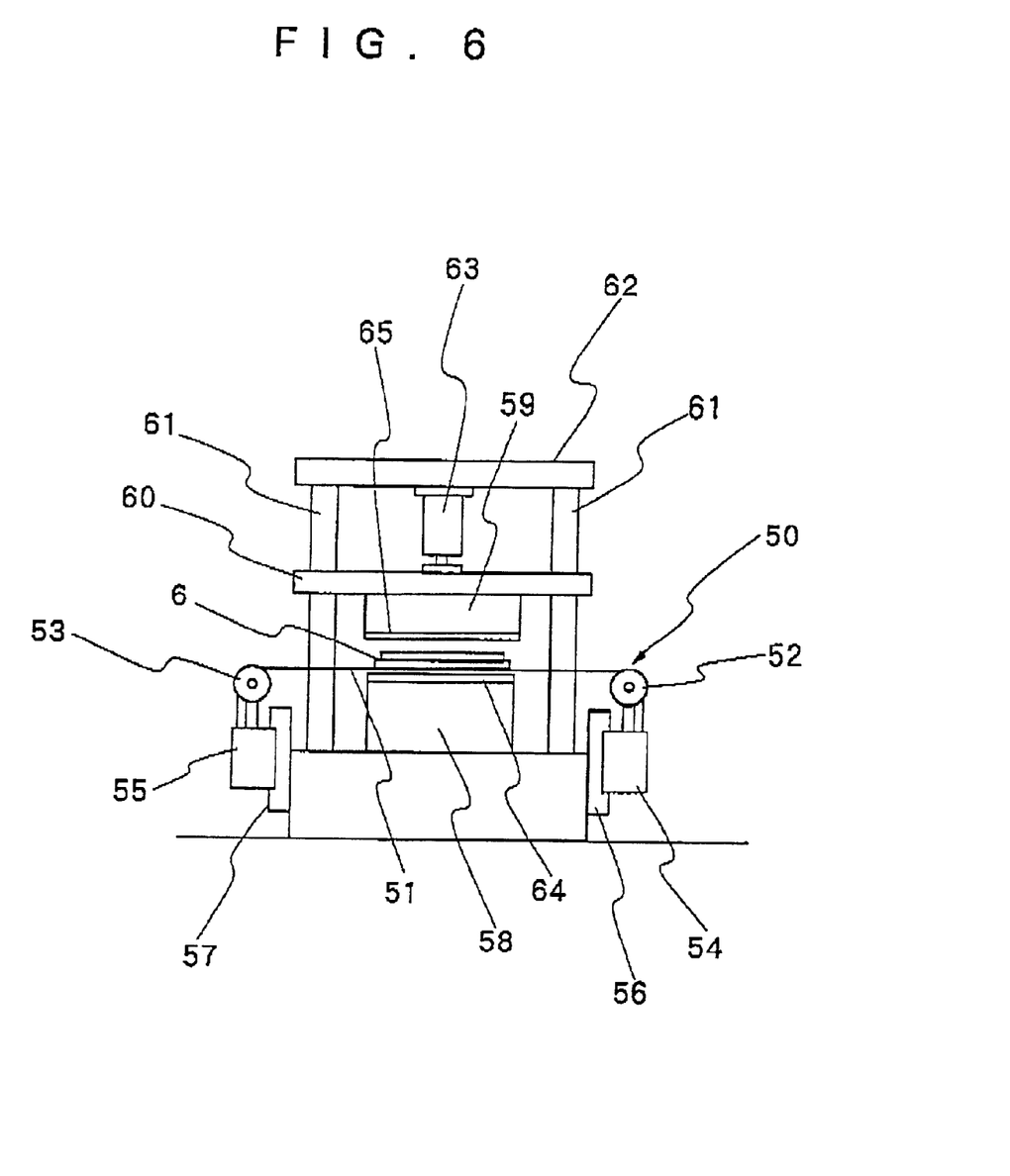
FIG. 6 is a schematic illustration of a hot press.

Each press stage of the hot press station 3 is built in the form as shown in FIG. 6. In that figure, indicated at 50 is a substrate transfer means including a conveyer belt 51, belt winders 52 and 53 and guide rollers 54 and 55. Opposite end portions of the conveyer belt 51 are wound on the belt winders 52 and 53 which are each provided with a motor (not shown), so that the conveyer belt 51 can be reciprocated between and toward and away from the belt winders 52 and 53. Further, the belt winders 52 and 53 and the guide rollers 54 and 55 are movable up and down along the lift guide members 56 and 57.

A joined substrate assembly 6 is delivered to one of the press stages by the conveyer belt 51. As soon as the conveyer belt 51 comes into abutment against a fixed press member 58, a drive cylinder 63 is lowered to bring a movable press member 59 into abutting engagement with the joined substrate assembly 6. At this time, a pressure is imposed on the joined substrate assembly 6. A heater is incorporated into each one of the press members 58 and 59 for pressing the joined substrate assembly 6 under heated conditions. The upper and lower substrate plates 11 and 10 of the substrate assembly 6 can be damaged if the press members 58 and 59 are directly abutted thereagainst. To prevent a problem of this sort, cushioning rubber sheets 64 and 65 are bonded on the abutting faces of the press members 58 and 59. Therefore, it is the cushioning sheets that are directly abutted against the substrate plates 10 and 11.

In this instance, as shown by way of example in FIG. 1, the press stages are provided in two parallel rows, i.e., a row of press stages 40a to 40d and a row of press stages 41a to 41d. These press stages can be arranged to press a joined substrate assembly 6 under the same conditions. However, it is preferable to employ different heating and pressing conditions for the individual press stages for multi-stage pressing of the joined substrate assemblies 6. More specifically, it is desirable to divide the press stages into a number of groups each operating under suitable conditions for progressive multi-stage pressing, instead of setting different operating conditions for all of the press stages. For example, a joined substrate assembly 6 can be heat-bonded through three press stages 40a, 40c and 40d which employ different operating conditions from each other at least in temperature or pressure conditions.

As soon as the gap space between the upper and lower substrate plates 11 and 10 of a joined substrate assembly 6 is narrowed down precisely to an appropriate width by the hot press-bonding, the substrate assembly 6 is picked up from the hot press station 3 and transferred to the inspecting station 4 by a handling member 7a of a substrate transfer means 7 similar to the one which is located between the provisional press station 2 and the hot press station 3. At the inspecting station 4, there are provided four TV cameras over the alignment marks 13 and 14 in four corner portions of upper and lower substrate plates 11 and 10 of a joined substrate assembly 6 to be inspected, thereby to check for positional deviations of the two substrate plates. Alignment between upper and lower substrate plates 11 and 10 of each substrate assembly 6 should be examined after the hot press at the station 3 because positional deviations could have occurred between the two substrate plates 11 and 10 during the hot press process.

Namely, at the press stages, the upper and lower substrate plates 11 and 10 of the joined substrate assembly 6 are abutted and pressed by the cushioning sheets 64 and 65 on the upper and lower pressing members, and the cushioning sheets 64 and 65 are compressed upon pressing the substrate plates 10 and 11. At such a time, a certain degree of distortion occurs to both of the cushioning sheets 64 and 65. Distortion of the cushioning sheets 64 and 65 can cause positional deviations to the substrate plates 10 and 11 because undried sealer material 12 is interposed between the two substrate plates. In addition, the individual cushioning sheets 64 and 65 at the press stages 40a to 40d and 41a to 41d have inherent compressive characteristics, which differ from each other particularly in direction and degree of distortion. Besides, the distortion of the cushioning sheets 64 and 65 at the respective press stages more or less change with time.

Upon compression, the cushioning sheets 64 and 65 on the upper and lower pressing members are not necessarily distorted in the different direction and to the different degree. In addition, instead of undergoing uniform flexural deformation, the cushioning sheets 64 and 65 are distorted in various directions when compressed in the course of the pressing operation. As a consequence, positional deviations in spontaneous direction can occur to the upper and lower substrate plates 11 and 10 in the course of the pressing operation. Generally speaking, a large positional deviation occurs in the directions of X- and Y-axes, but a positional deviation may occur in the rotational direction, namely, in the direction of the angle θ.

Further, in a case where a wiring pattern is provided on one of the upper and lower substrate plates 11 and 10, there arise a problems attributable to a difference in thermal expansion rate from the other substrate plate without a wiring pattern. In addition of application of a predetermined pressure by the upper and lower pressing members 58 and 59, the upper and lower substrate plates 10 and 11 are heated for a predetermined time period. Therefore, positional deviations based on the difference in thermal expansion rate can occur to the substrates 10 and 11.

Thus, at the hot press station 3, positional deviations occur can occur to the upper and lower substrate plates 11 and 10 for various reasons. Regardless of the cause of positional deviations, certain reproducibility is observed in the direction and amount of deviations with regard to upper and lower substrate plates of joined substrate assemblies which have been processed through the same group of press stages. Namely, if changes with time of compressive characteristics of the cushioning sheets 64 and 65 are ignorable, upper and lower substrate plates 11 and 10 of joined substrate assemblies 6 which have been pressed through the same group of press stages show similar positional deviations.

Therefore, at the time of aligning upper and lower substrate plates 11 and 10 with each other, it is desirable to set the two plates in such positions as to offset positional deviations which will predictably occur subsequently in the course of hot press-bonding. In a case where it is predicted that positional deviations of the upper and lower substrate plates 11 and 10 are $\Delta_1 X, \Delta_2 Y$ and $\Delta_3 \theta$, for example, the upper and lower substrate plates 11 and 10 are not registered in precisely aligned positions but are offset by $-\Delta_1 X, -\Delta_2 Y$ and $-\Delta_3 \theta$ relative to each other. As a consequence, due to relative positional deviations which occur at the hot press station 3, the offset shifts of position in the preceding aligning stage are canceled to bring the two substrate plates 10 and 11 precisely into alignment with each other.

In this instance, at the hot press station 3, joined substrate assemblies 6 are each passed through one of a plural number of routes or one of a plural number of groups of press stages which can differ from each other in the direction and extent of positional deviations of substrate plates. Therefore, at the hot press-bonding station 3, offset data should be made for each one of the routes through which the joined substrate assemblies are to be passed.

Namely, necessary offset data are obtained by detecting positional deviations of upper and lower substrate plates 11 and 12 of joined substrate assemblies 6 which have come out of the hot press station 3. Since the hot press station 3 provides a plural number of routes for the joined substrate assemblies 6, it is necessary to detect positional deviations and make the offset data for each one of the routes. Besides, in order to compensate for changes in compressive characteristics which occur to the cushioning sheets 64 and 65 as a result of repeated pressing operations, the offset data of each route need to be corrected on a time basis.

For example, offset data are prepared in the manner as follows. A set of offset data includes directions of offset and amounts of shift in position. The directions of offset include components in the directions of two perpendicularly intersecting axes, namely, in the direction of X- and Y-axes, and a component in an angular direction, namely, in the direction of angle $\theta$.

It is for obtaining offset data that upper and lower substrate plates 11 and 10 of joined substrate assemblies 6 from the hot press station 3 are examined for positional deviations at the inspection stage 4. The offset data are prepared by analyzing picture images taken by TV cameras 70. A set of offset data is prepared for each route of the hot press station 3 and registered in a control circuit 71. The registered offset data are applied to X-Y position adjusting mechanism 23 of the lower substrate holder table 21 as well as to a drive section of the lower substrate holder table 21. Thus, according to signals from the drive section, the offset data are reflected in the adjustment of the position of the lower substrate plate 10 by the X-Y position adjusting mechanism 23 and the lower substrate holder table 21.

In principles, the relative positions of the upper and lower substrate plates 11 and 10 can be detected by way of two alignment marks. Therefore, it suffice to provide the TV cameras 70 over two of four corner portions of a joined substrate assembly 6 under examination. However, in a case which requires to detect substrate positions in a more precise and strict manner, it is necessary to detect all of the alignment marks in the four corner portions of the joined substrate assembly 6. Detection of four alignment marks is necessary especially in the case of the upper and lower substrate plates 11 and 10 which can be different from each other in thermal expansion coefficient due to difference of material, and elongation of the substrate plates by thermal expansion may not be always uniform in the directions of X- and Y-axes and may occur primarily in one particular direction. Taking these points into consideration, one may face a situation in which one particular alignment mark is largely deviated while other three alignment marks are each in an exactly registered position. For this reason, it is desirable to check for positional relations of all of four alignment marks.

Described below are a method of detecting positional deviations of upper and lower substrate plates 11 and 10 of the joined substrate assemblies 6 which have come out of the hot press station, and steps for preparing offset data on the basis of the results of detection of positional deviations. In order to make offset data, upper and lower substrate plates 11 and 10 are registered one on the other in a precisely aligned state at the provisional press station 2, and then the resulting joined substrate assembly 6 is fed to the hot press station 3 to bond the two substrate plate by hot pressing and at the same time to form a gap of a predetermined caliber therebetween. The substrate assembly is then picked up from the hot press station 3 for detection of positional deviations of the upper and lower substrate plates 11 and 10.

As described above, eight press stages are provided t the hot press station 3. Therefore, eight hot pressing routes are available in a case where the joined substrate assemblies are hot-pressed by a single press stage. A plural number of hot pressing routes can also be set even in the case of multi-stage pressing in which a joined substrate assembly 6 is pressed through two or three press stages. Accordingly, a number of routes are registered in the control circuit 71 along with the respective offset data.

Figure 7:
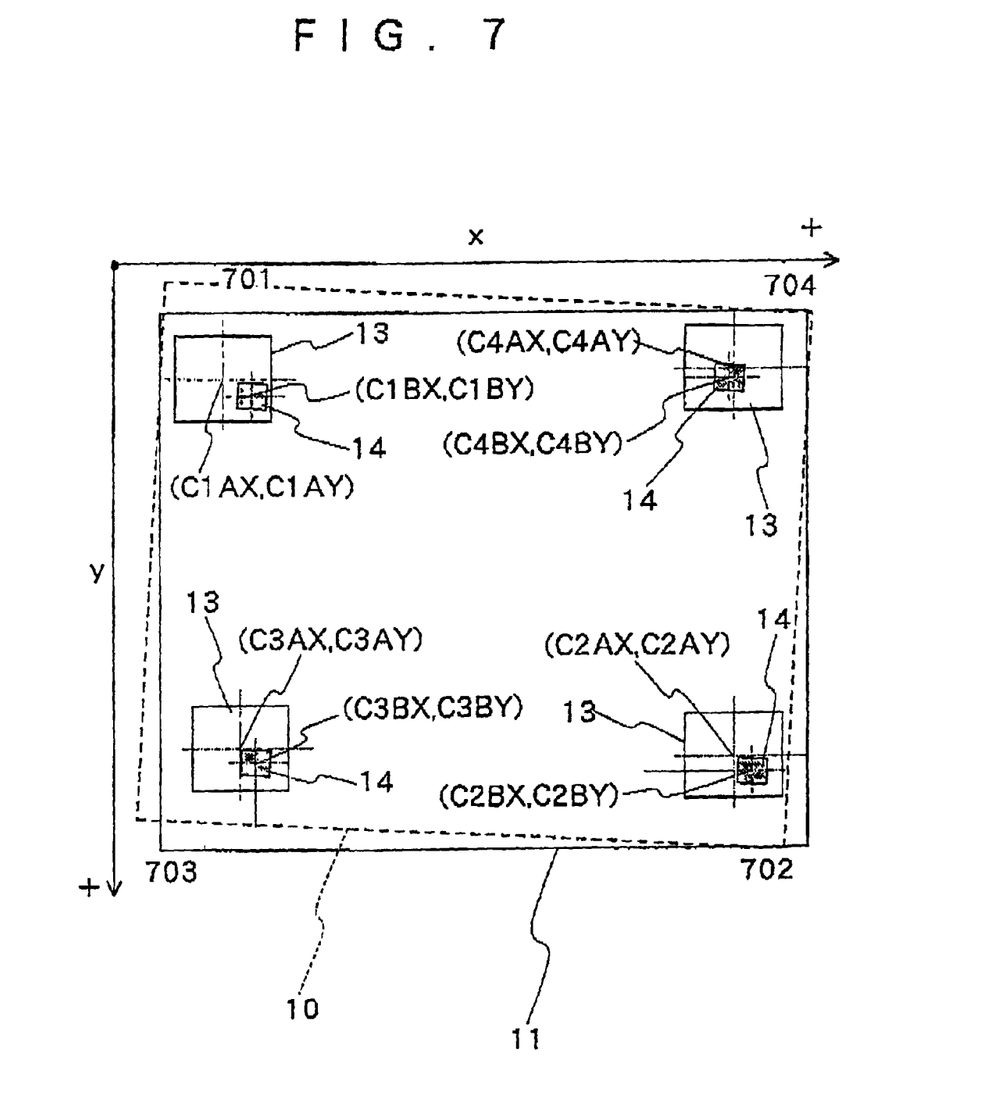
FIG. 7 is a diagrammatic illustration explanatory of principles for detection of positional deviations of upper and lower substrate plate.

In the first place, as shown in FIG. 7, deviations between center points of alignment marks 13 and 14 in four corner portions of the lower and upper substrates 10 and 11 are calculated on an imaginary X-Y coordinate system. In FIG. 7, of the four TV cameras 70 which are located over four corner portions of a substrate assembly 6, a TV camera which is located over one corner portion of the substrate assembly is labeled with a reference numeral 701, a TV camera on the right side of the TV camera 701 is labeled with a reference numeral 704, a TV camera on the lower side is labeled with a reference numeral 702, and a TV camera in a diagonal corner portion is labeled with a reference numeral 702. Here, X-Y coordinates of a center point of the alignment mark 13 in the TV camera are expressed (C1AX, C1AY), and X-Y coordinates of center points of alignment marks 13 in the TV cameras 702, 703 and 704 are expressed as (C2AX, C2AY), (C3AX, C3AY) and (C4AX, C4AY), respectively. Similarly, X-Y coordinates of a center point of the alignment mark 14 in the TV camera 701 are expressed as (C1BX, C1BY), while X-Y coordinates of center points of the alignment marks 14 in the TV cameras 702, 703 and 704 are expressed as (C2BX, C2BY), (C3BX, C3BY) and (C4BX, C4BY), respectively.

Firstly, a relative deviation of the upper and lower substrate plates in the rotational direction is determined on the basis of the following calculations, i,e, a calculation of an angle θ14U=Arctan [(C1AY−C4AY)/(C1AX−C4AX)], which is an angle with X-axis of a straight ling passing through the center point of the alignment mark 13 in the TV camera 701 and the center point of the alignment, mark 13 in the TV camera 704, a calculation of an angle θ13U=−Arctan [(C1AX−C3AX)/(C1AY−C3AY)], which is an angle with Y-axis of a straight line passing through the center point of the alignment mark 13 in the TV camera 701 and the center point of the alignment mark 13 in the TV camera 703, a calculation of an angle θ23U=Arctan [(C2AY−C3AY)/(C2AX, C3AX)], which is an angle with X-axis of a straight line passing through the center point of the alignment mark 13 in the TV camera 702 and the center point of the alignment mark 13 in the TV camera 703, and a calculation of an angle θ24U=−Arctan [(C2AX−C4AX)/(C2AY−C4AY)], which is angle with Y-axis of a straight line passing through the center point of the alignment mark 13 in the TV camera 702 and the center point of the alignment mark 13 in the TV camera 704.

A deviation in the rotational direction of the lower substrate plate 11 on the X-Y coordinates is determined on the basis of the following calculations, i.e., a calculation of an angle θ14L=−Arctan [(C1BY−C4BY)/(C1BX−C4BX)], which is an angle of deviation from X-axis of a straight line passing through the center point of the alignment mark 14 in the TV camera 701 and the center point of the alignment mark 14 in the TV camera 704, a calculation of an angle θ13L=−Arctan [(C1BX−C3BX)/(C1BY−C3BY)], which is an angle with Y-axis of a straight line passing through the center point of the alignment mark 14 in the TV camera 701 and the center point of the alignment mark 14 in the TV camera 703, a calculation of an angle θ23L=Arctan [(C2BY−C3BY)/(C2BX−C3BX)], which is an angle with X-axis of a straight line passing through the center point of the alignment mark 14 in the TV camera 702 and the center point of the alignment mark 14 in the TV camera 703, and a calculation of an angle θ24L=−Arctan [(C2BX−C4BX)/C2BY−C4BY)], which is an angle with Y-axis of a straight line passing through the center point of the alignment mark 14 in the TV camera 702 and the center point of the alignment mark 14 in the TV camera 704.

A relative positional deviation of the substrate plates 10 and 11 in the rotational direction is calculated on the basis of the foregoing data. Namely, calculations in this regard include calculation of θ14=θ14U−θ14L, a difference between the angles θ14U and θ14L, calculation of θ13= θ13U−θ13L, a difference between the angles θ13U and θ13L, calculation of θ23=θ23U−θ23L, a difference between the angles θ23U and θ23L, and calculation of θ24=θ24U−θ24L, a difference between the angles θ24U and θ24L.

Finally, a substantial deviation in the rotational direction $\Delta_3\theta$ is obtained by choosing maximum and minimum values among θ14, θ13, θ23 and θ24 and dividing the sum by 2, $\Delta_3\theta$=[MAX(θ14, θ13, θ23, θ24)+MIN(θ14, θ13, θ23, θ24)]/2.

In the next place, relative positional deviations of the substrate plates 10 and 11 in the directions of X- and Y-axes are calculated. The calculations in this regard include calculation of dx1=C1AX and dy1=C1AY−C1BY, i.e., deviations in the directions of X- and Y-axis of the alignment marks 13 and 14 in the TV camera 701, calculation of dx2=C2AX−C2BX and dy2=C2AY−C2BY, i.e., deviations in the directions of X- and Y-axis of the alignment marks 13 and 14 in the TV camera 702, calculation of dx3=C3AY−C3BX and dy3=C3AY−3BY, i.e., deviations in the directions of X- and Y-axes of the alignment marks 13 and 14 in the TV camera 703, and calculation of dx4=C4AX−C4BX and dy4=C4AY−C4BY, i.e., deviations in the directions of X- and Y-axis of the alignment marks 13 and 14 in the TV camera 704.

A substantial deviation in the direction of X-axis $\Delta_1 X$ is determined by choosing maximum and minimum values from among dx1, dx2, dx3 and dx4, which are calculated in the manner as described above, and dividing their sum by 2, $\Delta_1 X$=[MAX(dx1, dx2, dx3, dx4)+MIN(dx1, dx2, dx3, dx4)]/2. Then, a substantial deviation in the direction of Y-axis $\Delta_1 Y$ is determined by choosing maximum and minimum values from among dy1, dy2, dy3 and dy4, which are calculated in the manner as described above, and dividing their sum by 2, $\Delta_1 Y$=[MAX(dy1, dy2, dy3, dy4)+MIN(dy1, dy2, dy3, dy4)]/2.

On the basis of the thus obtained relative deviations $\Delta_1 X$ and $\Delta_1 Y$ of the substrate plates 10 and 11 in the directions of X- and Y-axes and deviation $\Delta_3\theta$ in the rotational direction θ, a set of offset data $(-\Delta_1 X, -\Delta_2 Y, -\Delta_3\theta)$ is calculated for a joined substrate assembly 6 which has been passed through a certain route of the hot press station 3.

Accordingly, in adjusting positions of upper and lower substrate plates 10 and 11 on the substrate holder table 21 and the suction pad 22 by way of picture images from the TV cameras 31 at the provisional press station 2, the alignment marks 13 and 14 are not precisely registered one on the other but are located in positions which are deviated contrarily from a precisely aligned position in the directions of X- and Y-axes and in the rotational direction to offset the positional deviations which are precalculated in the manner as described above. In the particular embodiment shown, the suction pad 22 for the upper substrate plate is movable only in Z direction, so that adjustments of relative positions in X, Y and θ directions are made on the side of the lower substrate holder table 21. Accordingly, at the time of registering two substrate plates 10 and 11 at the provisional press station 2, the lower substrate plate 10 is rotated by $-\Delta_3\theta$ from an aligned position, and in this state it is deviated by $-\Delta_1 X$ and $-\Delta_2 Y$ in the directions of X- and Y-axes, respectively. Namely, in reference to the upper substrate plate 11 which is gripped on the suction pad 22, the lower substrate holder table 21 is turned by $-\Delta_3\theta$ and, and the position of the lower substrate plate is shifted by $-\Delta_1 X$ and $-\Delta_2 Y$ in the directions of X- and Y-axis through the X-axis table 24 and Y-axis table 27 of the X-Y position adjusting mechanism 23, respectively. As a result, upper and lower substrate plates of a joined substrate assembly 6 are accurately registered and aligned with each other in the course of hot pressing at the hot press station 3.

At the time of pressing a joined substrate assembly 6, the upper movable press member 59 is lowered straight toward the substrate assembly 6, so that it is generally the case that, of the positional deviations $\Delta_1 X$, $\Delta_2 Y$, $\Delta_3\theta$, the deviation in the rotational direction θ does not take place in a large degree. Besides, in detecting a deviation, it is estimated as half of maximum and minimum values. Therefore, there may be a case in which a relative deviation between upper and lower substrate plates can be suppressed to a tolerable range even if the deviation in the rotational direction $\Delta_3\theta$ is ignored. In such a case, it suffices to calculate deviations $\Delta_1 X$ and $\Delta_2 Y$ alone and store them in the control circuit 71 as offset data.

Figure 8:
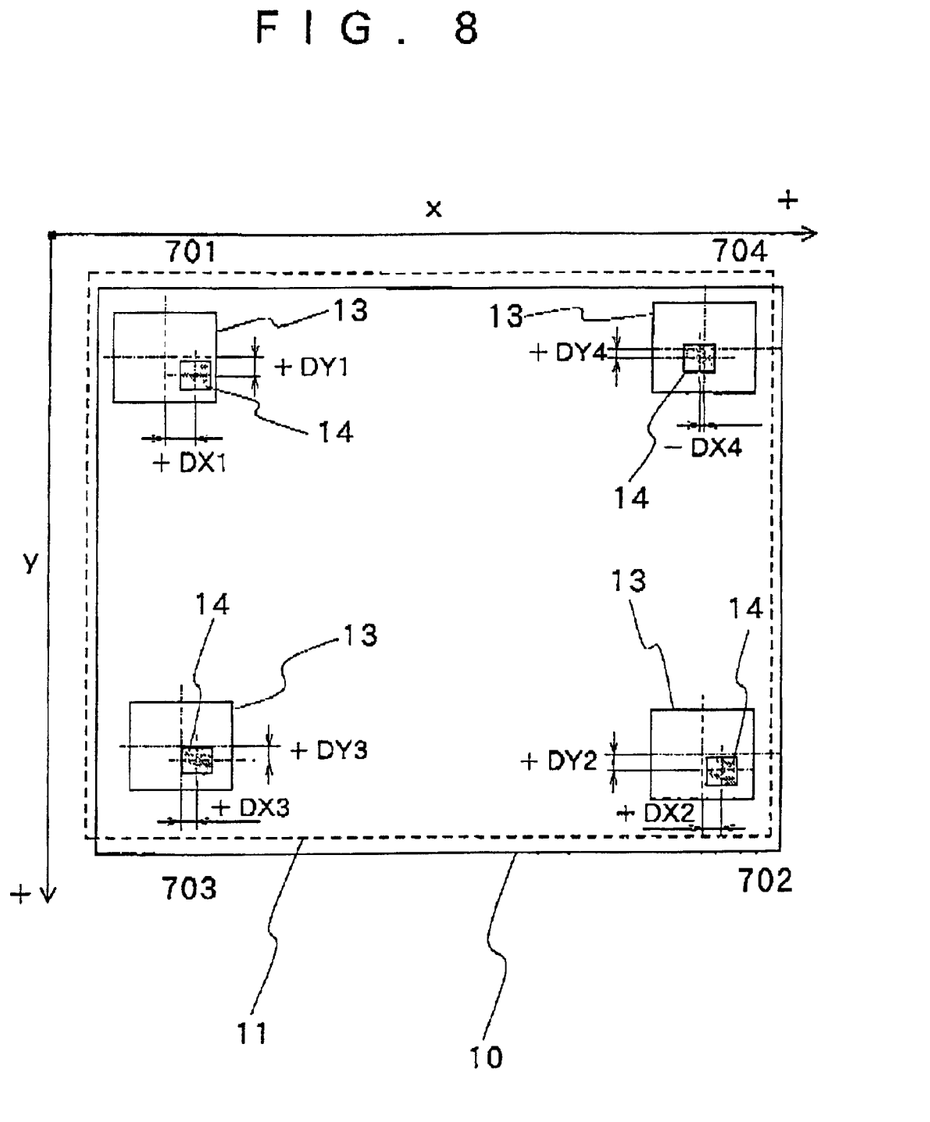
FIG. 8 is a diagrammatic illustration explanatory of principles in another method of detecting positional deviations of upper and lower substrate plates.

In a case where the applying offset data are restricted to the components in the X- and Y-axis directions, excluding the component in θ direction, the offset data can be prepared by the following method. Namely, in this case, as shown in FIG. 8, deviations are calculated on the basis of differences between two axes which perpendicularly intersects with each other at the center points of the alignment marks 13 and 14 in each corner of the substrate assembly. More specifically, as shown in FIG. 8, of the four TV cameras 70 which are located over four corner portions of a substrate assembly, it is the TV camera 701 which detects positional deviations (+DX1, +DY1) of the alignment mark 13 from the alignment mark 14. Besides, positional deviations (−DX2, +DY2), (+DX3, +DY3) and (+DX4, +DY4) are detected by TV cameras 702, 703 and 704, respectively. In this instance, the direction of a positional deviation is of an alignment mark 13 from an alignment mark 14 and each deviation is regarded as positive "+" when in a rightward or downward direction and negative "−" when in a leftward or upward direction on the face of the drawing.

In order to determine a positional deviation in the direction of X-axis, a more leftward deviation between the deviations DX1 and DX4 is taken as a leftward deviation DXL, while a more rightward deviation between DX2 and DX3 is taken as a rightward deviation DXR. Averaging these deviations (DXL+DXR)/2, there is obtained $\Delta_1 X$ which is a substantial deviation in the direction of X-axis. Similarly, a more upward deviation between the DY1 and DY4 is taken as an upward deviation DYU, and a more downward deviation between DY2 and DY3 is taken as a downward deviation DYD. Averaging these deviations (DYD−DYU)/2, there is obtained $\Delta_2 Y$, a substantial deviation in the direction of Y-axis.

On the basis of the detected deviations, a set of offset data $(-\Delta_1 X, -\Delta_2 Y)$ is registered with the control circuit 71. In this case, instead of precisely registering the alignment marks 13 and 14 at the time of adjusting the positions of upper and lower substrate plates 11 and 10 in reference to picture images from the TV cameras 31 at the provisional press station, the positions of the two substrate plates are adjusted in such a way as to offset the deviations which are expected to occur in the course of hot pressing at the hot press station 3. Namely, one of the alignment marks 13 and 14 is deviated from the other one by $-\Delta_1 X$ and $-\Delta_2 Y$. Therefore, in this case, the position of one substrate plate is simply shifted along two perpendicularly intersecting axes in a horizontal plane, there is no need for providing a rotational drive mechanism for the lower substrate holder table 21 of the provisional press station 2. If necessary, adjustments in the rotational or angular direction θ can be made on the side of the lift shaft 30. In other words, the lift shaft 30 may be coupled with a rotational mechanism.

The offset data as obtained by the method of FIGS. 7 and 8 are actually sampled for a plural number of times. In this regard, it is desirable that sampled data be further processed by statistic analytical calculations such as analysis of variance and averaging operations. Considering changes with time of operating characteristics of the cushion sheets, the offset data should preferably be corrected to reflect data of positional deviations which are detected at the inspecting station 4 from joined substrate assemblies which have actually been pressed at the hot press station 3. The correction of data of this sort may be effected in every time, or accumulated data may be corrected only when a detected deviation exceeds a preset allowable range of variation.

Any way, the offset data is prepared for each route at the hot press station 3, and calculated on the basis of positional deviations which are detected at the inspecting station 4, which is located posterior to the hot press station 3. Accordingly, for example, four hot pressing routes are available in a case where the first two press stages in each row, 40*a* and 40*b* or 41*a* and 41*b*, are used as a first press stage, the next press stages 40*c* and 41*c* are used as a second press stage, and the posterior press stages 40*d* and 41*d* are used as a third press stage, respectively. As mentioned hereinbefore, the offset data are registered in the control circuit 71 for each one of the hot pressing routes at the hot press station 3. Thus, the upper and lower substrate plates 11 and 10 of each joined substrate assembly 6 are bonded to each other always in correctly adjusted positions at the end of the hot pressing no matter which one of hot pressing routes it has passed at the hot press station 3.

What is claimed is:

1. A method for bonding two substrate plates together through a sealer material and in a precisely aligned state in a stage of hot-pressing the two substrate plate to form a gap space of a predetermined width therebetween, said method comprising the steps of:

registering two substrate plates one on the other in a registering state in reference to alignment marks provided on the respective substrate plates and in such offset positions as to cancel positional deviations which predictably occur to the substrate during a subsequent hot-pressing operation;

provisionally pressing the registered substrate plates through a sealer material in a provisional press stage to form a joined substrate assembly;

hot-pressing said joined substrate assembly on a press means and under heated conditions in a hot pressing state thereby compressing and flattening said sealer material to form a gap space of a predetermined width between said substrate plates and at the same time thermally hardening said sealer material; and inspecting the hot-pressed substrate assembly in an inspecting stage to check for positional deviations between said upper and lower substrate plates.

2. A method for bonding two substrate plates as defined in claim 1, wherein, in said registering stage, said two substrate plates are set in offset positions by relatively shifting positions of said substrate plates in a horizontal plane along two perpendicularly intersecting axes.

3. A method for bonding two substrate plates as defined in claim 1, wherein, in said registering stage, said two substrate plates are set in offset positions by relatively shifting positions of said substrate plates in a horizontal plane along two perpendicularly intersecting axes and in a rotational direction.

4. A method for bonding two substrate plates as defined in claim 1, wherein, in said inspecting stage, deviations in relative positions between said substrate plates are detected before and after hot pressing, for the purpose of obtaining offset data with regard to the extent and directions of offsetting to be applied during registering of two additional substrate plates.

5. A method for bonding two substrate plates as defined in claim 4, wherein, in said inspecting stage, positional deviations of said substrate plates of said joined substrate assembly are detected after hot pressing to obtain said offset data.

6. A method for bonding two substrate plates as defined in claim 5, wherein said substrate plates of said joined substrate assembly are each of a rectangular shape and provided with alignment marks in four corner portions, and positional deviations of said alignment marks are detected on the basis of picture images taken by cameras located over four corner portions of said joined substrate assembly.

7. A method for bonding two substrate plates as defined in claim 4, wherein a plural number of press means are provided in said hot pressing stage, and offset data are made for one of said press means.

8. A method for bonding two substrate plates as defined in claim 4, wherein a plural number of press means are provided in said hot pressing stage, said joined substrate assembly is hot-pressed progressively through a plural number of press means in one of a plural number of predetermined hot pressing routes, and said offset data are made for one of said hot pressing routes.

9. A method for bonding two substrate plates as defined in claim 4, wherein positional deviations of substrate plates of joined substrate assembly are detected after hot pressing, and results of detection are fed back to correct said offset data.

10. A method for bonding two substrate plates as defined in claim 9, wherein said offset data are corrected upon hot-pressing the joined substrate assembly in said hot press stage.

11. A method for bonding two substrate plates as defined in claim 9, wherein correction of said offset data is effected only when a detected deviation exceeds a predetermined allowable range.

* * * * *